Sept. 20, 1960      E. C. KIEKHAEFER      2,953,335
OUTBOARD PROPULSION UNITS FOR BOATS
Filed Sept. 30, 1959      9 Sheets-Sheet 1

INVENTOR.
ELMER C. KIEKHAEFER

Sept. 20, 1960      E. C. KIEKHAEFER      2,953,335
OUTBOARD PROPULSION UNITS FOR BOATS
Filed Sept. 30, 1959      9 Sheets-Sheet 2
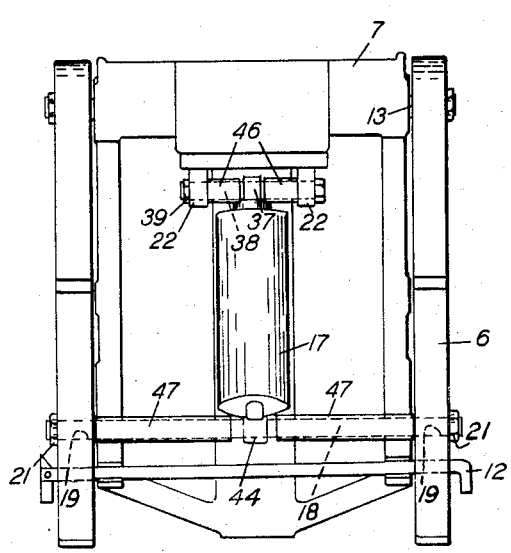
FIG.4.
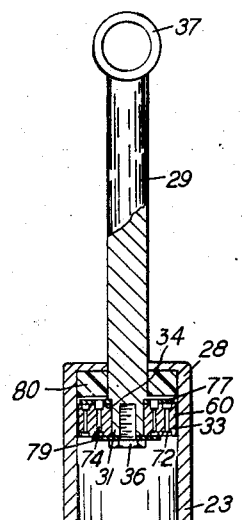
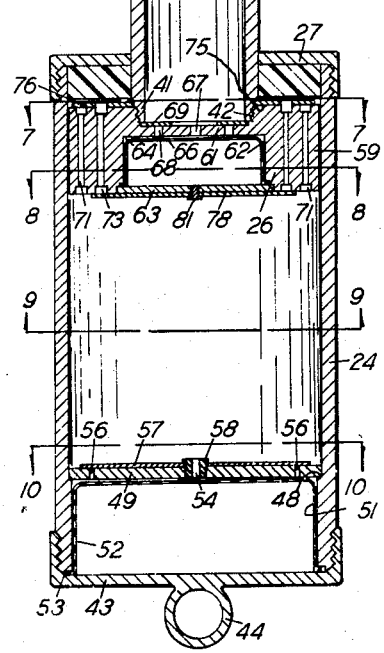
FIG.6.
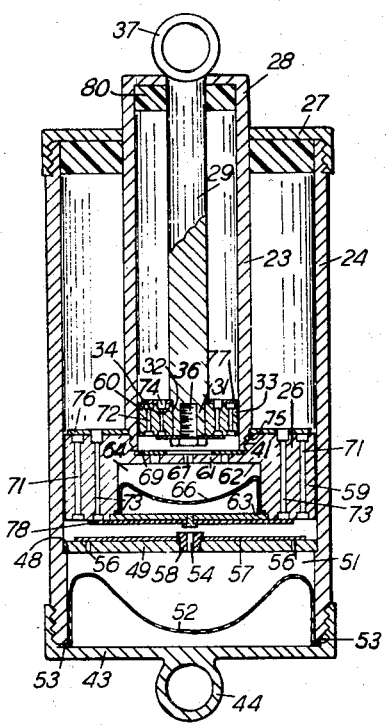
FIG.5.
INVENTOR.
ELMER C. KIEKHAEFER

INVENTOR.
ELMER C KIEKHAEFER

Sept. 20, 1960 E. C. KIEKHAEFER 2,953,335
OUTBOARD PROPULSION UNITS FOR BOATS
Filed Sept. 30, 1959 9 Sheets-Sheet 5
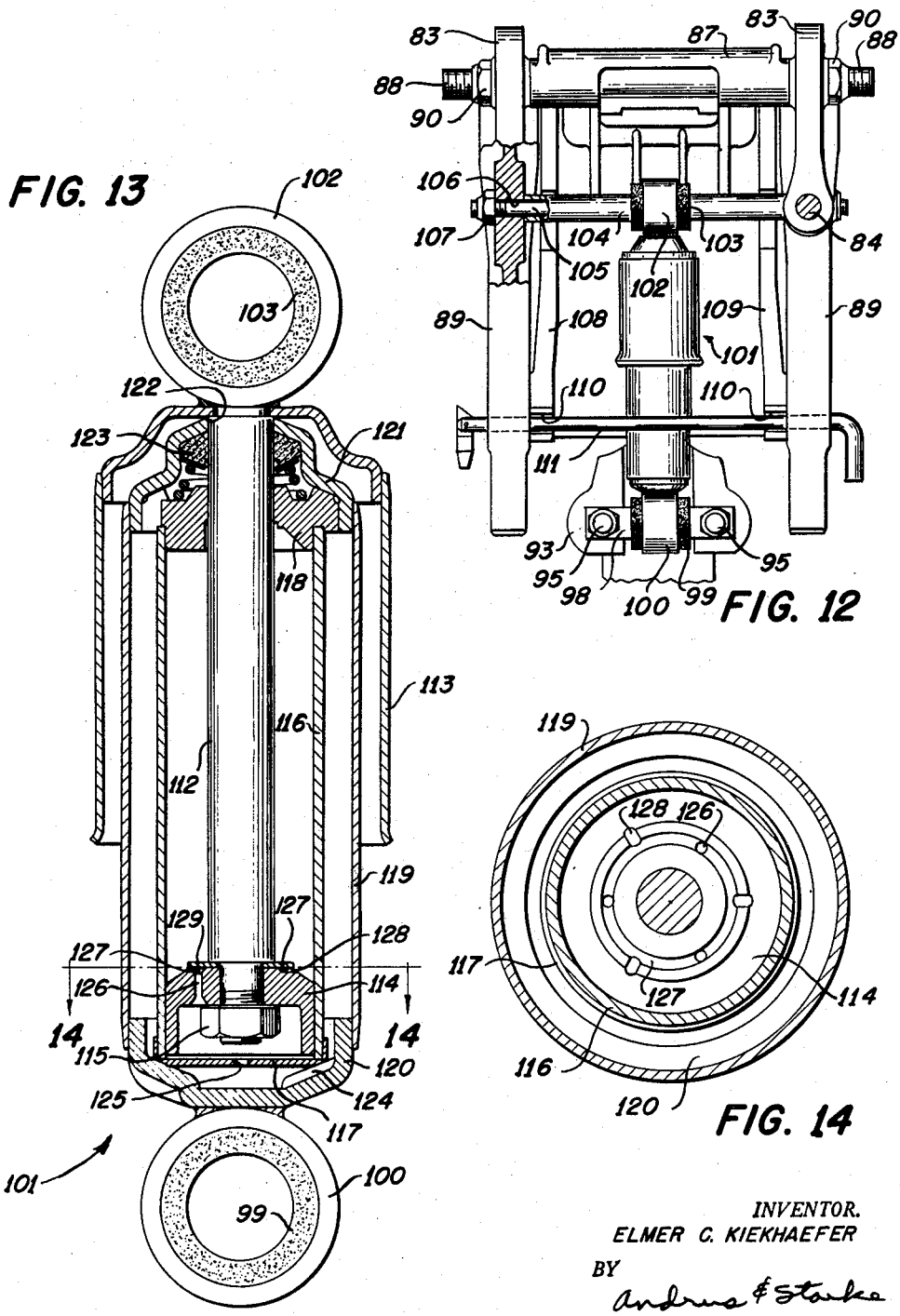
INVENTOR.
ELMER C. KIEKHAEFER
BY
Andrus & Starke
Attorneys

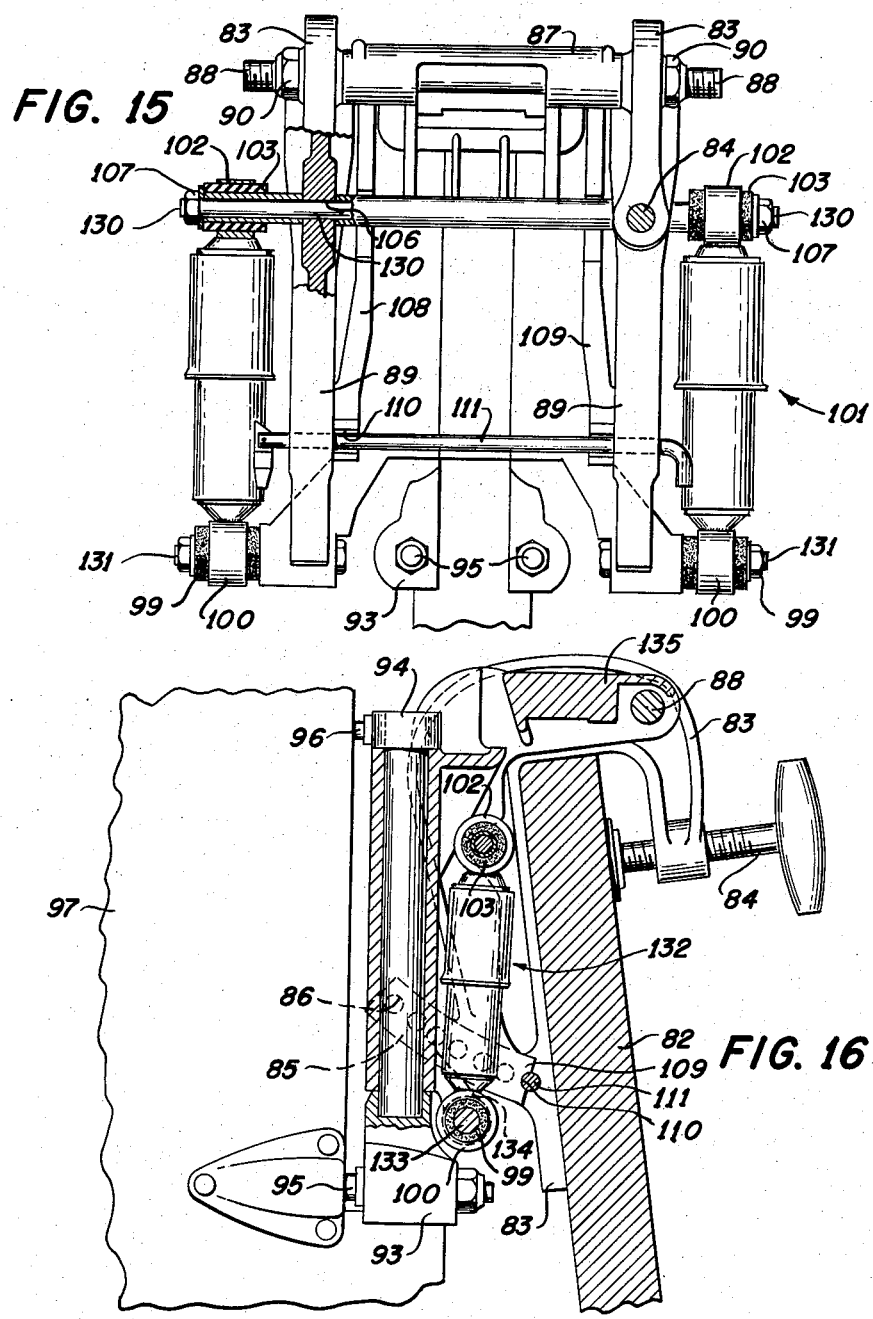

INVENTOR.
ELMER C. KIEKHAEFER

Sept. 20, 1960  E. C. KIEKHAEFER  2,953,335
OUTBOARD PROPULSION UNITS FOR BOATS
Filed Sept. 30, 1959  9 Sheets-Sheet 8

INVENTOR.
ELMER C. KIEKHAEFER
BY
Andrus & Starke
Attorneys

Sept. 20, 1960   E. C. KIEKHAEFER   2,953,335
OUTBOARD PROPULSION UNITS FOR BOATS
Filed Sept. 30, 1959                                              9 Sheets-Sheet 9

INVENTOR.
ELMER C. KIEKHAEFER
BY
Andrus & Starke
Attorneys

United States Patent Office 2,953,335
Patented Sept. 20, 1960

2,953,335

OUTBOARD PROPULSION UNITS FOR BOATS

Elmer C. Kiekhaefer, Cedarburg, Wis.
(735 N. Water St., Milwaukee 2, Wis.)

Filed Sept. 30, 1959, Ser. No. 843,560

13 Claims. (Cl. 248—4)

This invention relates to an outboard propulsion unit supported to tilt about a horizontal transverse pivotal axis and more particularly to such a unit provided with damping means for damping the angular momentum of the tilting unit about the pivotal axis.

This application is a continuation-in-part of applications by the same inventor identified as Serial No. 545,427, filed November 7, 1955, entitled "Damping Device for Outboard Motors," and Serial No. 688,518, filed October 7, 1957, and entitled "Shock Absorber Mount for Outboard Motors," both applications, now abandoned.

As a safety measure as well as for other reasons, outboard propulsion units such as outboard motors have long been constructed to tilt or pivot freely about a horizontal transverse pivotal axis. This freedom to pivot serves as a relief when the motor strikes a submerged or floating object and thus provides a degree of protection against damage to the motor and to the boat transom to which the motor is secured.

With the relatively large and high powered outboard motors capable of high speed, common today, impact with a submerged or floating object imparts a considerable angular momentum to the motor about its pivotal axis in an upward direction causing a considerable impact between the motor and its mounting bracket at the top of the pivot. Any unexpended angular momentum from the impact at the top of the motor pivot is added to the angular momentum due to the weight of the motor during the downward pivot of the motor and causes further hammer-like blows against the motor mounting bracket at the bottom of the motor pivot. The hammer-like blows against the mounting bracket at the bottom of the motor pivot may be further aggravated by the thrust of the turning propeller as it re-enters the water.

In rough or churned-up waters, too, where the boat is frequently inclined with respect to the horizontal as when approaching a wave crest, the motor due to its weight tends to maintain its position relative to the pre-inclined boat and therefore pivots or "trails out" behind the inclined boat. In this circumstance the propeller thrust also drives or pivots the motor back toward the boat with hammer-like impacts. The impacts between the motor and its mounting bracket at the top and bottom of the motor pivot can and often do cause damage to the motor, its mounting bracket, or to the boat transom or sternboard to which the motor is secured. It is primarily an object of this invention to absorb or damp the angular momentum of the pivoting motor and thereby prevent possible damage due to the aforementioned impacts of the pivoting motor.

In accordance with this invention a damping mechanism is interposed and connected between the pivotal outboard propulsion unit and its mounting bracket or the transom of the boat to which the propulsion unit is secured for dissipating or absorbing the kinetic energy of the pivoting propulsion unit in either or both the upward or downward directions of pivot.

The arrangement and construction of the damping mechanism provides that there be little or no damping of the pivoting propulsion unit in the upward direction until the leading edge of the skeg is substantially on a horizontal plane with the bottom of the boat or substantially free of the water surface so that the propulsion unit can clear the obstacle which caused the unit to pivot. Thereafter, progressively heavier damping is applied to prevent a violent impact at the top of the pivot. To minimize the time required for the propulsion unit to return to the normal running position, little or no damping is applied in the initial portion of the return pivot and thereafter progressively heavier damping is applied to prevent violent impact at the end of the return pivot. Damping action during downward pivot also prevents the violent impacts after the propulsion unit "trails out" and is driven back toward the craft to which it is secured by the propeller thrust.

The accompanying drawings illustrate the best mode for carrying out the invention as presently contemplated and set forth hereinafter.

In the drawings:

Fig. 4 is a segmental front elevation of the outboard motor structure shown in Fig. 2;

Fig. 5 is an enlarged axial section showing the two-way or double acting damping means in a closed position;

Fig. 6 is an enlarged axial section showing the damping means of Fig. 5 in a fully extended position;

Fig. 12 is a front elevation of the mounting shown in Figure 11, certain parts being broken away and sectioned for clarity;

Fig. 13 is an enlarged axial section of the shock absorber or damper shown in Figures 11 and 12;

Fig. 14 is an enlarged transverse section taken on line 14—14 of Fig. 13;

Fig. 15 is a view similar to Fig. 12, but showing a modification of the invention wherein two absorber units are employed;

Fig. 16 is a view generally similar to Figure 11 showing another modified form of the invention wherein the lower end of the absorber is secured to the swivel bracket;

Figure 1:
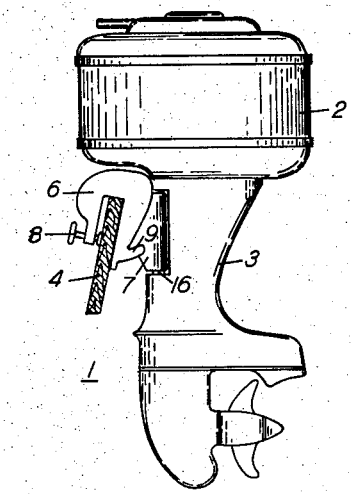
Figure 1 is a side elevation partly in section showing an outboard motor embodying the invention secured to the transom of a boat.

Referring to the drawings, the invention is first illustrated as applied to an outboard motor 1 having a cowl 2 mounted on a hollow or tubular drive shaft housing 3. The outboard motor 1 is fastened pendently to a transom 4 of a boat, not shown, by attachment means comprising a clamp bracket 6 and a swivel bracket 7.

The clamp bracket 6 is of inverted C-clamp structure adapted to engage over the upper edge of the transom 4, and carries a clamping screw 8 at the lower end adapted to engage the inside of the transom 4 to clamp the transom between the end of the screw 8 and the opposite portion of clamp bracket 6. The clamp bracket 6 is provided with a rearwardly projecting horn 9 having spaced openings 11 therein adapted to receive a tilt adjustment pin 12 for selectively positioning the housing 3 at a desired operating position with respect to the vertical.

The swivel bracket 7 of the attachment means is of inverted L-shape when viewed in side elevation and is pivotably connected to the clamp bracket 6 by means of a transverse horizontal tilt pin 13. The swivel bracket 7 further has a generally vertically extending elongated opening 14 through which a swivel pin 16 passes with its ends engaging bushings, not shown, in the housing 3 to pivotably connect the swivel bracket 7 to the housing 3.

The swivel bracket 7 has a forwardly opening U-shaped cavity therein for receiving a shock absorber or damper 17. One end of damper 17 is pivotably secured to the clamp bracket 6 of the motor by a pin 18 extending through transversely spaced openings 19 shown dotted in Fig. 4, the pin 18 being retained on the clamp bracket by means of nuts 21. The other end of damper 17 is pivotably supported from laterally spaced flanges 22 provided on the swivel bracket 7.

A two-way or double acting shock absorber or damper 17 is shown in Figs. 5 and 6 as having a pair of telescoping tubular members 23, 24 forming the pressure cylinders of the two-stage damper with member 23 forming a portion of piston 26 reciprocally disposed within member 24 as explained hereinafter.

The threaded upper end of the tubular member 24 is closed by means of a threaded end cap 27 which is apertured centrally thereof to slidably receive the reciprocating tubular member 23.

The upper end 28 of the tubular member 23 in integrally formed with the cylinder portion and apertured centrally thereof to slidably receive the piston rod 29.

The lower end 31 of the piston rod 29 is stepped to form shoulder 34 and passes through a centrally disposed opening 32 in a piston 33 and is connected thereto by means of a cap screw 36.

The upper end of the piston rod 29 is provided with an annular attaching ring 37 which is adapted to be pivotably mounted on bolt 38 extending through transverse aligned openings formed in flanges 22, the bolt 38 being retained on the swivel bracket by means of a nut 39.

The threaded lower end 41 of the tubular member 23 engages a threaded bore 42 provided in the piston 26 to secure the piston thereto. The threaded lower end of the tubular member 24 is closed by the threaded end cap 43 having an annular attaching ring 44 provided outwardly thereof through which the pin 18 passes for pivotably connecting the tubular member 24 to the clamp bracket 6.

The damper 17 is restrained from lateral or transverse movement relative to the bracket members 6 and 7 by means of spacer bushings 46 and 47 carried by the bolt 38 and pin 18, respectively.

The lower end of the tubular member 24 is provided with an annular seat 48 for supporting the disk 49 forming a recuperating chamber 51 therebeneath for housing a rubber member shown as an air bag 52 having an annular rim 53 interposed and secured between the tubular member 24 and the end cap 43.

The recuperating chamber 51 serves to accommodate the mineral oil or other suitable incompressible fluid employed as a damping medium and displaced by the piston 26 and tubular member 23 within the tubular member 24. This displaced fluid is forced into the recuperating chamber 51 through a small hole 54 provided centrally in the disk 49, and compresses the air filled bag 52 for accommodation within the chamber.

When the piston 26 and tubular member 23 are withdrawn from the tubular member 24, the fluid within the recuperating chamber 51 is forced out therefrom by the expanding bag 52 through the hole 54 and a series of circumferentially spaced holes 56 in the disk 49. The fluid flow is controlled in part by a non-return annular spring valve 57 mounted on the disk 49 by means of an annular pin member 58.

The pistons 26 and 33 of damper 17 preferably comprise sintered iron bodies 59 and 60, respectively, which are oil impregnated. The body 59 of the piston 26 is provided with a thin wall section 61 centrally thereof interposed between the threaded bore 42 and a stepped bore 62.

The stepped bore 62 is closed off by a circular plate 63, which is press fit therein to form the recuperating chamber 64 for housing an air bag 66 similar to the chamber 51 and bag 52 and for a similar purpose. The thin wall section 61 is provided with a central hole 67 through which the fluid passes into the recuperating chamber 64 when the piston rod 29 is depressed, and a series of radially spaced holes 68 controlled by an annular spring valve 69 in addition to the opening 67 to provide passage of the fluid from the recuperating chamber 64 when the piston rod is extended.

The piston bodies 59 and 60 include a series of outwardly disposed circumferentially spaced passageways 71 and 72, respectively, and inwardly disposed circumferentially spaced passageways 73 and 74, respectively.

Fluid flow through the passageways 71, 72, 73 and 74 of the pistons 26 and 33 is controlled by upper and lower annular spring valves as shown in Figs. 5, 6, 7 and 9. The upper spring valves 76 and 77 are respectively interposed between the piston bodies 59 and 60 and the annular shoulders 75 and 34 provided on the tubular member 23 and piston rod 29, respectively, while the lower spring valves 78 and 79 are respectively mounted to the plate 63 by a rivet 81 and to the piston rod end 31 by the cap screw 36.

The resistance of the damper 17 upon movement of the pistons 26 and 33 into or out of the tubular members 24 and 23, respectively, is controlled by the cross sectional area of the passageways 71, 72, 73 and 74 and by the strength and flexure characteristics of the spring valves 76, 77, 78, and 79 which cooperate to govern the flow of the fluid therethrough.

Figure 2:
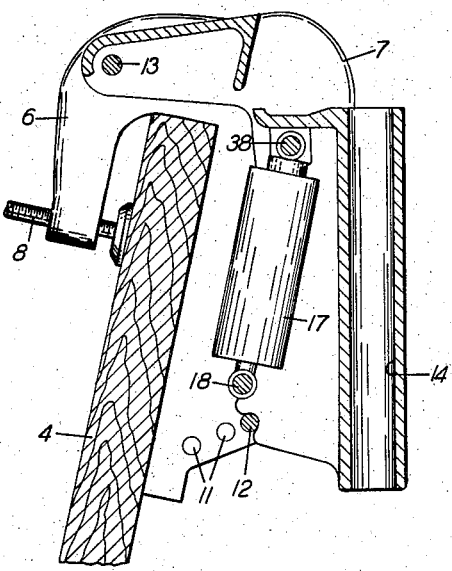
Fig. 2 is a segmental side elevation partially in section showing the outboard motor of Fig. 1 in the normal running position with the damping means in a fully retracted position.

In operation, assuming the outboard motor 1 is initially in the normal running position as shown in Figures 1 and 2, and that the underwater portion engages an obstruction forcing the propulsion unit to tilt rearwardly and upwardly on pin 13, upward pivotal movement of the swivel bracket 7 with the pivotal motor unit causes the piston rod 29 and piston 33 to be withdrawn from the tubular member 23 until the piston engages the sealing stop member 80 at the upper end 28 of tubular member 23. Thereafter further damping is effected as piston 33 urges tubular member 23 upwardly withdrawing the same from the tubular member 24. The incompressible fluid in the upper portion of each of the members 23 and 24 above the respective pistons 26 and 33 effects damping and is forced through the corresponding passageways 73 and 74 and corresponding valves 78 and 79 into the lower portion of each of the corresponding members 23 and 24 as the pistons move upwardly. Simultaneously, the pressure within the chambers 51 and 64 drops and the fluid therein is forced upwardly through the corresponding holes 54, 56, 67, 68 and past the valves 57 and 69 by the expanding air bags 52 and 66 to fill the chambers immediately beneath the respective pistons.

In the embodiment of the invention illustrated in Figures 1–10 of the drawings, the passageways 73 and 74 and corresponding valves 78 and 79 of the pistons 26 and 33 are adapted to provide relatively little resistance to fluid flow therethrough so that the swivel bracket 7 and motor may be tilted rearwardly with little damping taking place. Upon downward pivotal movement of the swivel bracket 7 with the pivotal motor unit, the piston 33 and piston rod 29 are depressed into the tubular member 23 to its limiting position, and thereafter the tubular member 23 and piston 26 are depressed into the tubular member 24. As these members move downwardly, the incompressible fluid displaced by the piston rod 29 and tubular member 23 is forced into the respective recuperating chambers 64 and 51 through the corresponding holes 67 and 54. Also, fluid in the tubular members 23 and 24 beneath the pistons 26 and 33 is forced through the passageways 71 and 72 and past the corresponding valves 76 and 77 into the upper portions of the tubular members above the pistons. The passageways 71 and 72 and the characteristics of the valves 76 and 77 are adapted to considerably restrict the flow of fluid therethrough and thereby provide a relatively heavy damping action to downward movement of the swivel bracket 7 and motor 1.

As indicated, the damping action of the two-way, two-stage damper 17 is dependent upon the cross sectional area of the passageways 71, 72, 73 and 74, respectively, and the strength and flexure characteristics of the corresponding spring valves 76, 77, 78 and 79. Thus the first stage piston 33 may be adapted to provide relatively little damping as it moves upwardly within tubular member 23 and considerably more damping as it moves downwardly. The second stage piston 26 may be adapted to provide relatively heavy damping as it moves in both directions within tubular member 24.

Figure 3:
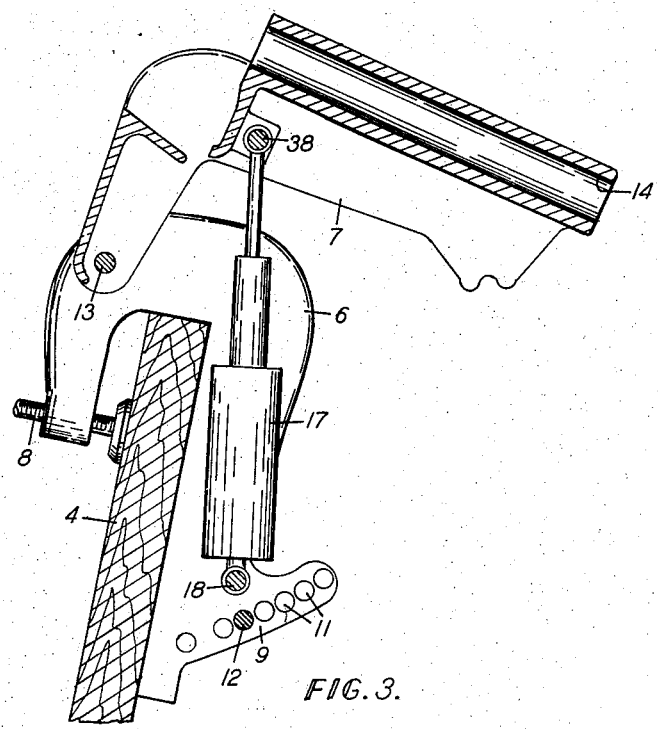
Fig. 3 is a segmental side elevation similar to Fig. 2 but showing the outboard motor tilted rearwardly with the damping means in a fully extended position.
Figure 7:
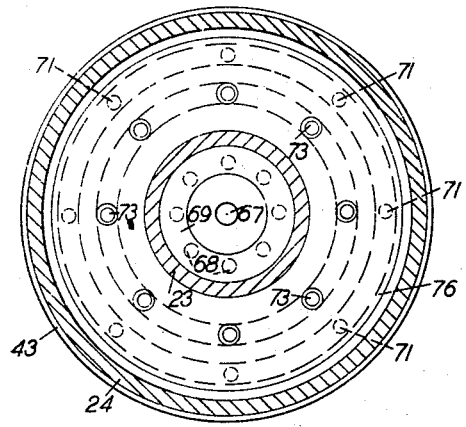
Fig. 7 is an enlarged transverse section taken on line 7—7 of Fig. 6.
Figure 8:
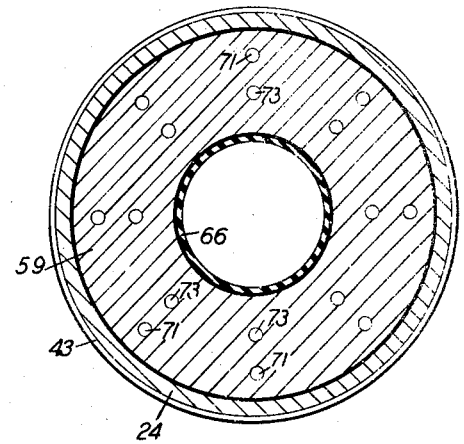
Fig. 8 is an enlarged transverse section taken on line 8—8 of Fig. 6.
Figure 9:
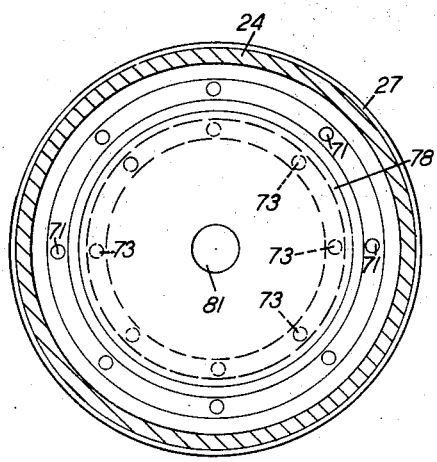
Fig. 9 is an enlarged transverse section taken on line 9—9 of Fig. 6.
Figure 10:
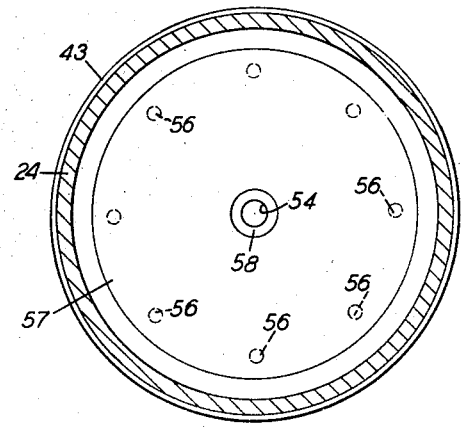
Fig. 10 is an enlarged transverse section taken on line 10—10 of Fig. 6.

If a damper 17 of these characteristics were mounted between the respective brackets 6 and 7 of an outboard motor in the manner indicated in Figures 2–4, the piston 33 would move upwardly in tubular member 23 with but little resistance as the motor clears whatever obstacle caused pivoting. After the piston 33 reaches the end of its stroke, the piston 26 is actuated to provide heavy damping and thereby minimize the impact of the motor at the top of the pivot. As the motor unit returns to the water, the piston 33 and the piston 26 provide damping to minimize the motor impact at the bottom of the movement. In the event the motor "trails out" and perhaps moves only the piston 33 within member 23, the damping provided at the return stroke of the piston will greatly minimize the impact as the motor returns to its normal running position.

Referring now to Figures 11–20 of the drawings, the boat sternboard or transom 82 is adapted to receive the clamp bracket 83 which is secured thereto by the clamp screws 84. The bracket also includes rearwardly extending arm portions 85 each having a plurality of tilt adjustment holes 86.

The swivel bracket 87 is mounted for vertical swinging relative to the clamp bracket about the horizontal pin 88. The pin 88 extends through a wide horizontal portion of the swivel bracket and also through the side portions 89 of the clamp bracket. A nut 90 threadably engaged on each end of the pin 88 holds it captive in the clamp bracket.

A swivel pin 91 extends through the elongated bore 92 of the swivel bracket 87 and is provided with a lower mounting yoke 93 and an upper mounting yoke 94 at its extremities to form the rotatable swivel pin unit for dirigibly carrying the motor. A pair of lower mounting bolts 95 and a pair of upper mounting bolts 96 secure the pin 91 to the drive shaft housing 97 of the motor. Thus, the swivel bracket 87 together with the drive shaft housing 97 and its swivel pin unit 91, 93, 94 form a vertically swingable assembly about the horizontal tilt pin 88.

A lower cross brace 98 extends across the lower mounting yoke 93 and is secured thereto by the lower mounting bolts 95. Mounted on the central portion of the cross brace 98 is a rubber bushing 99 which is secured in the lower eye 100 of the shock absorber unit 101.

The upper eye 102 of the shock absorber unit has a rubber bushing 103 mounted on a long sleeve 104 through which the bolt 105 extends. The bolt 105 also extends through apertures 106 in the clamp side portions 89 and is held captive therein by nut 107.

The lower end of the absorber 101 could also be attached elsewhere on the swinging part, as for example on the lower end of the swivel bracket, as shown in Fig. 16. However, with the particular mounting shown in Figures 11 and 12, a longer absorber can be accommodated which also has the advantage that a more direct connection is provided to the bottom mounting bolts without transmitting the load through the swivel pin.

Figure 11:
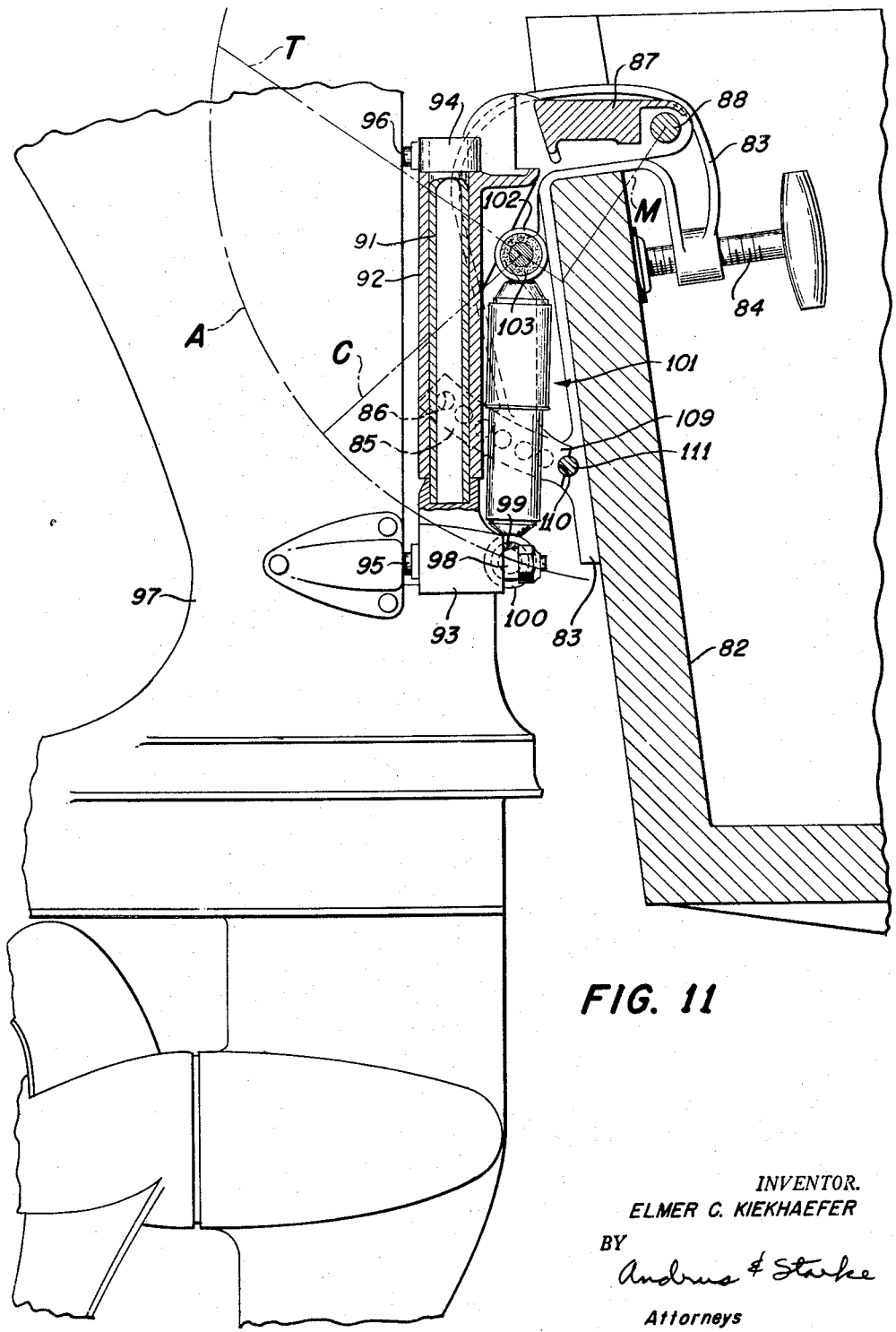
Fig. 11 is a side elevation with parts broken away and in section, of an outboard motor mounting showing another embodiment of the invention.

The swivel bracket 87 includes transversely spaced side plates 108 and 109 which each have a semi-cylindrical socket 110 adapted to embrace the tilt adjustment pin 111 when the motor is in the normal operating position shown in Fig. 11.

The shock absorber unit 101 shown in detail in Fig. 13 and 14, includes a piston rod 112 which is welded to the upper eye or mounting ring 102 and a tubular dirt shield 113 carried at the upper end of the rod 112 and secured in place as by welding to the ring 102. A piston 114 is secured to the inner end of rod 112 by the nut 115 threadably engaged on the rod end. The piston reciprocates in the pressure tube 116 as the unit is extended or contracted. The pressure tube has a lower end cover 117 which is welded thereto to seal the lower end of the pressure tube 116. In the upper end of the tube 116 is secured a rod guide plug 118 through which the rod 112 slides.

Mounted concentrically around the pressure tube 116 and cooperating therewith to form a reserve chamber, is the fluid reserve tube 119 which has a cap 120 welded across its lower end, and this cap is also welded to the lower mounting eye 100. Another cap 121 is welded across the top end of the reserve tube 119 and has a central opening 122 through which the rod 112 slides when the unit is expanded or contracted. The piston rod seal assembly 123 is disposed between the rod guide plug 118 and the cap 121 of the reserve tube 119.

Passageway 124 is provided in the lower end cap 120 so as to permit flow of fluid between the reserve chamber and the lower end of the pressure tube via the small aperture 125 in the center of end cover 117.

The piston 114 has a series of circumferentially spaced and generally axially extending orifices 126 extending therethrough which are connected together at their upper end by the annular groove 127 in the upper face of the piston. A series of radial slots 128 are formed in the upper face of the piston and extend outwardly from the annular groove 127. A thin spring plate 129 is secured on the top side of the piston to restrict fluid flow through the orifices.

The structure of the absorber unit is such that telescoping movement in the expanding or extending direction is retarded by the restricted flow through the piston so as to give a damping action in that direction. However, there is no appreciable restriction or damping action in the contracting direction of movement of the unit. In other words, when the piston 114 is moved upwardly in the pressure cylinder 116, the incompressible fluid in the upper end thereof must all pass through the restricting slots 128, groove 127 and orifices 126 in the piston as there is no other escape for this trapped fluid. However, when the piston travels in the downward direction, as when the unit is being contracted, the fluid in the lower end of the pressure tube 116 not only can pass upward through the orifices in the piston as the pressure difference across the piston lifts the spring valve, 129, but it may also pass downwardly through the central aperture 125 in the cover 117. Therefore movement in the contracting direction is little retarded.

Figure 17:
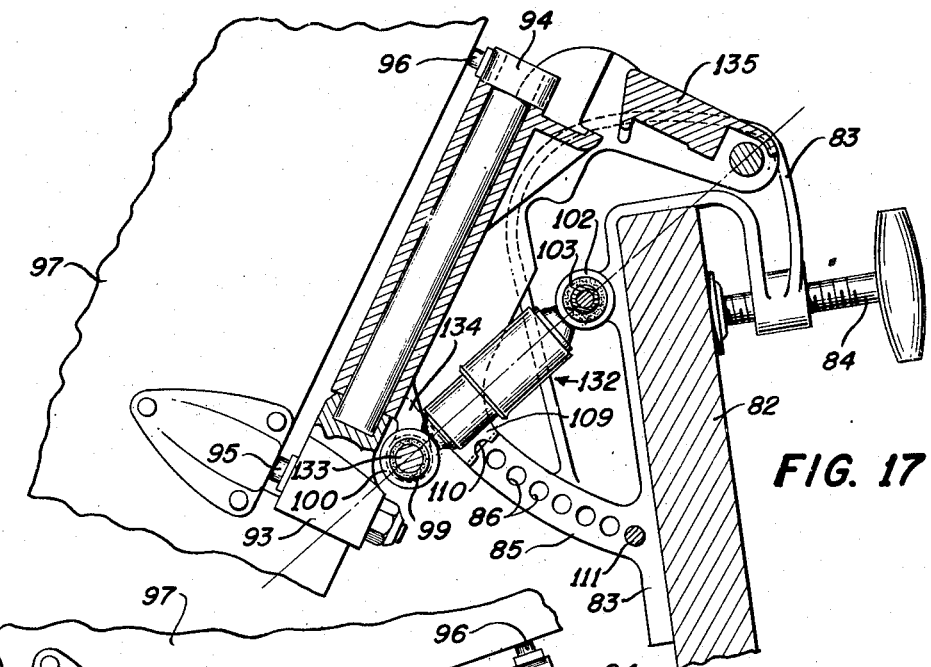
Fig. 17 is a view of the construction of Fig. 16 showing the motor pivoted with respect to the mounting bracket to the position where the shock absorber is fully contracted and the lower end of the motor approaches the water surface.

In addition to resisting movement of its telescoping members in the extending direction, the geometry of the absorber mounting relative to the fixed clamp bracket and swingable motor has a very desirable effect on the rate of damping as the motor tilts or swings upwardly. More particularly, during the initial swinging movement of the motor and when the absorber is tilted from its position for normal running operation shown in Fig. 11 to a position having no moment arm as indicated by line "C" in Fig. 11, which if extended passes through the pivotal axis of the motor as shown in Fig. 17, the absorber is contracted and therefore little if any damping action is imparted to the motor. This initial unrestricted rearward swinging of the motor provides quick and positive relief to the motor when striking a submerged or floating object. However, when the gear case of the motor has cleared the water surface and the shock absorber is tilted upwardly beyond line "C", the moment arm through which the absorber acts increases rapidly, thus giving greater leverage for the absorber to work through and thus causing progressively increasing damping action as the motor approaches the fully tilted position indicated by line "T" in Fig. 11. As the motor reaches its fully tilted position very little if any angular momentum remains.

The path of arcuate movement of the lower end of the absorber in swinging from the normal running position to a fully tilted position is indicated by the arcuate line "A" in Figure 11. The line "C" represents the position of the absorber axis when the leading edge of the skeg of the motor is on the horizontal plane with the bottom of the boat and is approximately clear of the water. At this position and as shown in Fig. 17 it will be noted that an extension of the absorber axis passes through the point of pivotal swinging of the motor. Therefore the absorber unit has no moment arm through which it is effective to resist swinging. The line "T" represents the position of the absorber unit when the motor is in the fully tilted position and the line "M" represents the moment arm through which the absorber is acting in the fully tilted position. The effective moment arm of the absorber therefore increases as it swings from position "C" to "T."

In swinging from the normal running position, shown in full lines in Figure 11, to the position indicated by line "C," the absorber actually contracts. With a one-way or single acting absorber as shown in Fig. 13 no damping takes place during this movement. When the motor returns to the normal running position, it is to be noted that the absorber is extended in tilting from its position along line "C" to the normal running position of Figure 11. The absorber thus also provides some damping for the motor to cushion the impact of the return movement.

The particular type of absorber shown which has simple orifice restrictions in its piston results in damping characteristics that are highly desirable in this device. The damping force of this type of piston varies approximately with the square of the piston velocity relative to the cylinder. The damping force of the piston therefore depends on the velocity of the piston at any particular angular position of the motor. The velocity in turn depends on the initial kinetic energy of the swinging motor and the total damping up to the position under consideration.

The kinetic energy to be absorbed from an upwardly swinging motor varies as the square of the boat speed when an obstruction is encountered. The damping force produced by the simple orifice type piston varies as the piston speed squared or with the swinging velocity squared and therefore with the boat speed squared. Therefore, if the damping is of the correct magnitude at one boat speed, it will be correct at all boat speeds. As a result the motor will tend to move through its full angle of swing upwardly for collisions at any boat speed and the average damping forces will always be the minimum required to do the job, which results in minimum strain on the motor parts and boat transom at all boat speeds.

Thus, with the single acting absorber having the geometry of the over-center arrangement of Figure 11, two advantages are obtained. An increasing lever arm and an increasing amount of piston travel per degree of motor swing are provided as the motor swings upwardly. The net result of these two effects produces a greatly increased damping moment as the motor approaches the fully tilted position for a given angular velocity of motor swing. Additionally, the geometry of this arrangement also provides for dissipation of energy during the return movement of the motor.

The modification shown in Fig. 15 operates and has the same functional characteristics as the device of Figure 11. In this embodiment, however, two absorber units 101 are employed. The bolt 130 extends outwardly beyond the clamp sides 89 and carries the upper ends of the absorbers 101 outwardly of the sides 89 of the clamp bracket 83. The lower ends of absorbers 101 are carried by transversely spaced and aligned bolts 131 extending outwardly from the lower end of the swivel bracket 87 generally in the horizontal plane of bolts 95. The two absorber units 101 of Fig. 15 have the same desirable geometric position, in a fore and aft plane, as does the Fig. 11 mounting.

Figure 18:
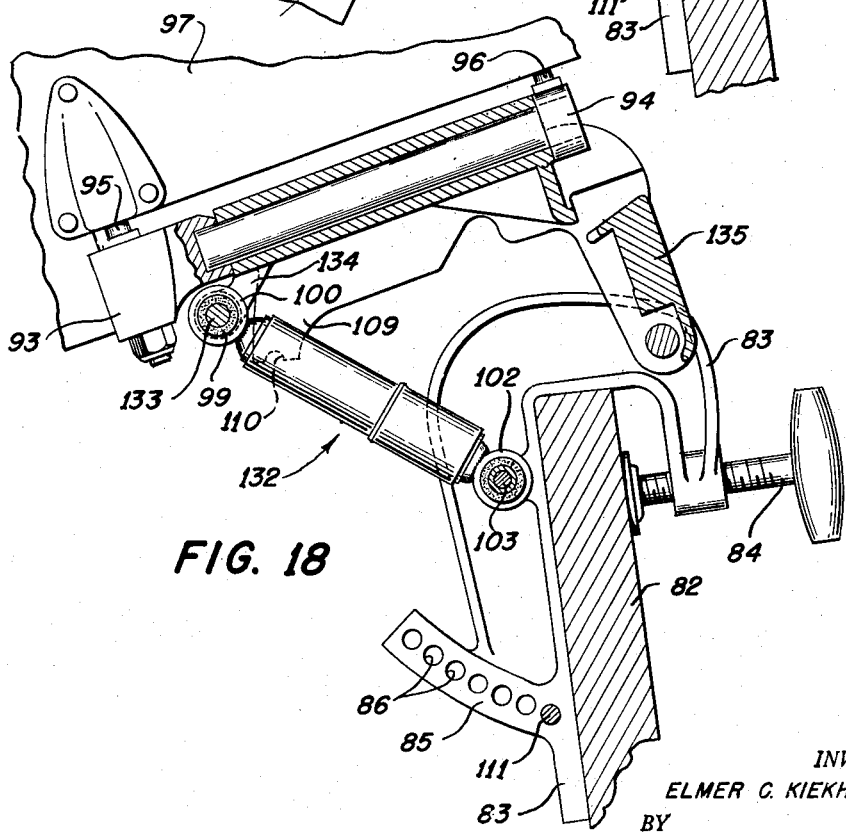
Fig. 18 is a view of the construction of Fig. 16 showing the motor approaching its top position with the absorber extended.

The modification of Figs. 16–18 employs one single-acting shock absorber unit 132 which is of the same type as unit 101 but of a smaller size. Unit 132 is mounted at its lower end on pin 133 extending through a transverse bore provided in the swivel bracket projection 134. The projection 134 extends downwardly and forwardly from the lower end of swivel bracket 135 to a position generally above the lower yoke mounting bolts 95 and is formed integrally with the swivel bracket. The action and geometry of this device is also similar to the arrangement of Fig. 11 with Fig. 17 showing the absorber in the fully contracted position represented by line "C" in Fig. 11. In Fig. 18 the absorber 132 is shown approaching the fully extended position represented by line "T" in Fig. 11.

Figure 19:
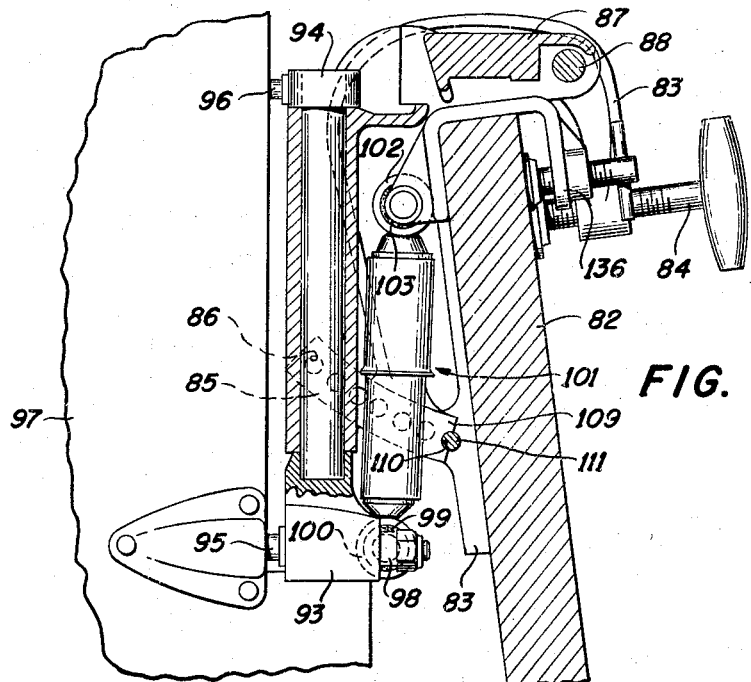
Fig. 19 is a view generally similar to Fig. 11 showing still another modification of the invention, wherein the upper end of the shock absorber is secured to the boat transom, and the lower end to the swivel pin.

Fig. 19 shows the upper end of the unit 101 attached to a separate clamp bracket 136 which is fastened directly to the sternboard or transom 89 of the boat. Here again, however, the geometry of the arrangement is the same as shown in Fig. 11 and described hereinbefore with its advantageous features.

Figure 20:
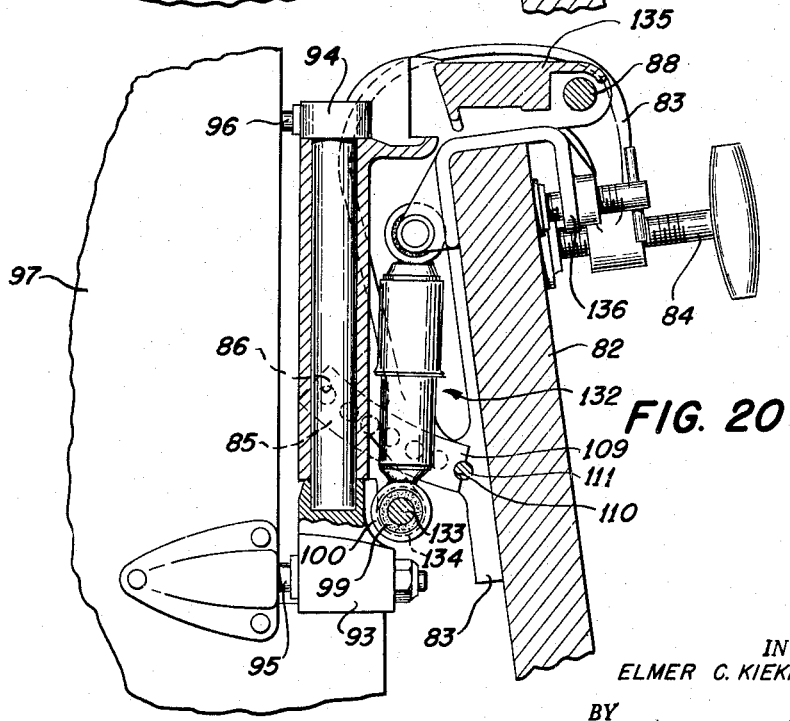
Fig. 20 is a view similar to Fig. 19 but showing the lower end of the absorber secured to the swivel bracket.

Fig. 20 is another modification which shows the smaller absorber unit 132 secured between the sternboard bracket 136 and the swivel bracket projection 134. Here again the over-center arrangement is such so as to provide the action and advantageous features described in connection with the other embodiments.

Figure 21:
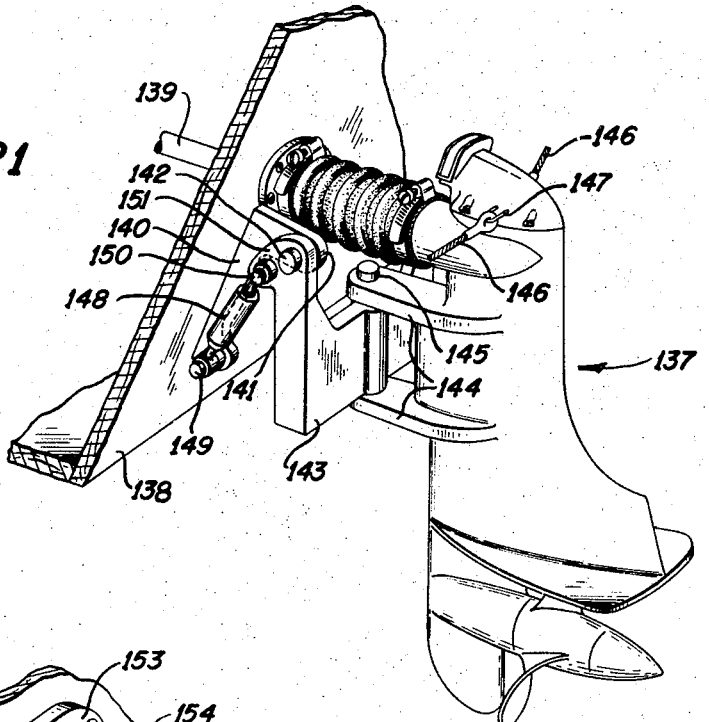
Fig. 21 is a perspective view of a dirigible outboard propulsion unit provided with damping means.

Referring now to Fig. 21, a dirigible outboard propulsion unit 137 is supported from the boat transom 138 and driven from an inboard power source, not shown, through the drive shaft 139 which extends through the transom. The propulsion unit 137 is supported from a mounting bracket 140 secured rigidly to the transom 138 of the craft being propelled by the unit. Mounting bracket 140 includes a pair of transversely spaced rearwardly extending projections 141 at the upper end thereof adapted to support the transversely spaced and horizontally aligned tilt pins 142. The swivel bracket 143 is pivotally supported from the tilt pins 142 and provides for pivotal movement of the propulsion unit in a vertical plane. Forwardly extending vertically spaced yoke arms 144 on the propulsion unit 137 are adapted to receive the swivel bracket 143 therebetween. A swivel pin 145 extends generally vertically through aligned holes in the yoke arms and swivel bracket to provide for pivotal movement of the propulsion unit on a vertical axis for steering. Steering control of the propulsion unit 137 may be effected by means of a rope or cable 146, shown in part, secured to opposed eyelets 147 provided on the unit, or by any other suitable steering control means.

By having the axes of tilt pins 142 and of swivel pins 145 intersect each other at the axis of drive shaft 139 and at right angles thereto as shown in Fig. 21, a simple universal joint (not shown) centered at the point of intersection in drive shaft 139 will effect a continuous driving connection for the unit during both tilting and steering movements.

One or more single-acting shock absorbers 148 are disposed between the mounting bracket 140 and the swivel bracket 143 for damping the kinetic energy imparted to the propulsion unit as when striking a submerged or floating object.

According to Fig. 21, a shock absorber 148 is mounted on each side of the bracket assembly of the propulsion unit. At the lower end, each absorber 148 is pivotally mounted on a pin 149 carried at the lower end of the mounting bracket 140. The upper end of the absorber is pivotally mounted on pin 150 carried by a forwardly extending projection 151 at the upper end of swivel bracket 143.

The absorber mounting arrangement of Fig. 21 provides the over-center operation shown and described in connection with Fig. 11 in which the absorber is fully contracted when the leading edge of the skeg of unit 137 is generally horizontally aligned with the bottom of the boat and is generally clear of the water surface. When pivoting vertically in either direction from the water clearing position, the angular momentum of the propulsion unit is damped by the absorber 148.

Figure 22:
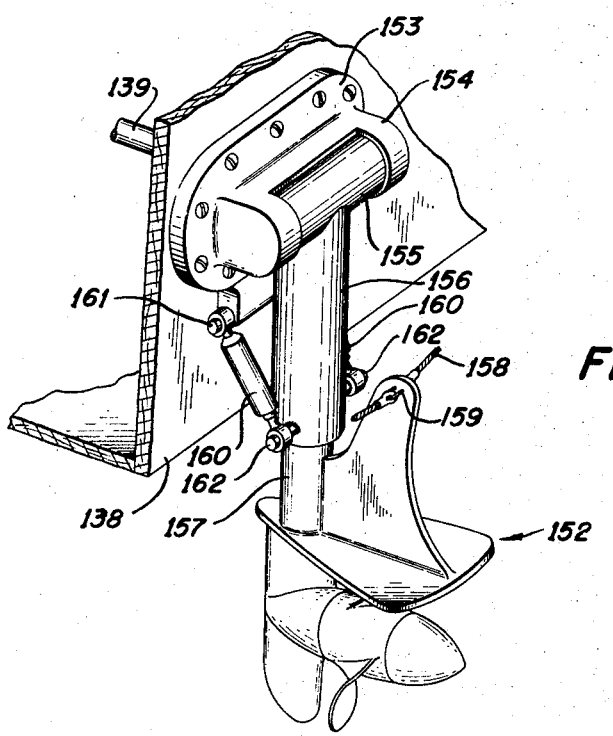
Fig. 22 is a perspective view of still another dirigible outboard propulsion unit provided with damping means.

In the outboard propulsion unit 152 of Fig. 22, the rigidly secured mounting bracket 153 includes a semi-cylindrical housing 154 which projects rearwardly and is adapted to pivotally support the outer housing member 155 for pivotal movement on a horizontal axis.

The lower tubular portion 156 of housing member 155 rotatably supports the propeller drive unit 157 projecting downwardly therefrom and provides for pivotal movement of the propeller drive unit on a vertical axis for steering. Steering control may be effected by rope or cable 158, shown in part, secured to the transversely opposed eyelets 159 on the propeller drive unit 157, or any other suitable means may be utilized to provide steering control for the propeller drive unit.

In Fig. 22, the shock absorbing means comprises a pair of shock absorbers 160 interposed between the mounting bracket 153 and the housing member 155. The upper ends of the shock absorbers 160 are pivotally mounted on transversely extending pins 161 which project outwardly from the mounting bracket 153 and the lower ends thereof are pivotally mounted on transverse pins 162 which project outwardly from the lower tubular portion 156 of housing member 155. If damping of the angular momentum of propulsion unit 152 is desired in one direction only, the shock absorbers 160 may be of a single-acting variety similar to shock absorber 101 of Fig. 13. If damping is desired in both directions of vertical pivot of the propulsion unit, then the absorbers 160 may be of a two-way or double acting variety and the damping may be effected in a single stage utilizing but one piston or in two stages utilizing two pistons as in the shock absorber 17 shown in Figures 5–10.

Various modes of carrying out the invention are contemplated as being within the scope of the following claims particularly pointing out and distinctly claiming the subject matter which is regarded as the invention.

1. In a damping device, the combination of: a piston rod having a first piston mounted on one end, a fluid confining first cylinder having one end apertured and receiving said piston rod with said first piston disposed within said first cylinder for reciprocal movement therein, a second piston mounted on the opposite end of said first cylinder, a second fluid confining cylinder having one end apertured and receiving said first cylinder with said second piston disposed within said second cylinder for reciprocal movement therein, said first and second pistons having a plurality of ports extending therethrough placing the cylinder portions on either side of the respective pistons in communication, a spring valve having a given flexure characteristic provided on the side of each piston mounting the piston rod and first cylinder, respectively, and covering a portion of the ports therethrough, and a second spring valve having a weaker flexure characteristic provided on the opposite side of each piston and covering the remainder of said ports, said valves controlling the fluid flow through said ports during operation of said damping device with movement of the piston rod and first cylinder in a direction contracting the length of the damping device being impeded due to the restricted fluid flow past the first named spring valves while movement in the opposite direction is less impeded due to the relative ease of fluid flow past the weaker spring valves.

2. In an outboard motor, the combination of: a clamp bracket adapted to secure said outboard motor to the transom of a boat, a swivel bracket for pivotably connecting said outboard motor to said clamp bracket and adapted to provide for pivoting of the motor on a horizontal transverse axis, damping means interconnecting the clamp bracket and swivel bracket and comprising a piston rod having one end pivotably connected to said swivel bracket and a first piston mounted on said other end, a first fluid confining cylinder having one end apertured to reciprocally receive said piston rod with said first piston disposed within said first cylinder for reciprocal movement therein, a second piston mounted on the opposite end of said first cylinder, a second fluid confining cylinder having one end pivotably connected to said clamp bracket and the opposite end apertured to reciprocally receive said first cylinder with said second piston disposed within said second cylinder for reciprocal movement therein, said first and second pistons having a plurality of ports extending therethrough placing the cylinder portions on either side of the respective pistons in communication, a spring valve having a given flexure characteristic provided on the side of each piston mounting the piston rod and first cylinder, respectively, and covering a portion of the ports therethrough, and a second spring valve having a weaker flexure characteristic provided on the opposite side of each piston and covering the remainder of said ports, said valves controlling the fluid flow through said ports during operation of said damping means and movement of the piston rod and first cylinder in a direction contracting the damping means being impeded due to restricted fluid flow past the first named spring valves while movement in the opposite direction is less impeded due to the relative ease of fluid flow past the weaker spring valves.

3. In a mounting for an outboard motor, a clamp bracket adapted to be secured to the transom of a boat, a support bracket carrying the motor and being pivotally secured to the clamp bracket on a transverse horizontal axis for pivoting the motor between a running position with the lower end of the motor in the water and a fully tilted inoperative position, said motor having a tilt position intermediate the running position and the fully tilted position wherein the lower end of the motor substantially clears the surface of the water, and an extendible damping member interposed between the clamp bracket and the support bracket and adapted to resist extension thereof, the lower end of said member being pivotally connected to the support bracket and the upper end of said member being pivotally connected to the clamp bracket, said ends being disposed on a line through said transverse axis and said member being fully contracted when the motor is disposed in said intermediate tilt position, said member being extended to resist movement and provide damping when the motor pivots from said intermediate tilt position either in the direction of the running position or in the direction of the fully tilted inoperative position.

4. In a mounting for a dirigible outboard propulsion unit for a boat, a bracket member adapted to be secured to the transom of a boat, a support bracket carrying the propulsion unit and being pivotally secured to the clamp bracket on a transverse horizontal axis for pivoting the unit between a running position with the lower end of the unit in the water and a fully tilted inoperative position, said unit having a tilt position intermediate the running position and the fully tilted position wherein the lower end of the unit substantially clears the surface of the water in service, and an extendible damping member interposed between the bracket member and the support bracket and adapted to resist extension thereof beyond the intermediate tilt position, the lower end of said member being pivotally connected to the support bracket and the upper end of said member being pivotally connected to the bracket member, said ends being disposed on a line through said transverse pivot axis of said unit and said member being fully contracted when the unit is disposed in said intermediate tilt position, said member being extended to resist movement and provide damping when the unit pivots from said intermediate tilt position either in the direction of the running position or in the direction of the fully tilted inoperative position.

5. In combination with an outboard motor having a clamp bracket to be secured to a boat, and a tilt bracket pivotally carried by said clamp bracket on a horizontal transverse axis and carrying the motor unit as an assembly; hydraulic cylinder-piston means to control the tilting movement of the unit, means pivotally connecting one member of said first named means to said tilt bracket-motor unit assembly, and means pivotally connecting the other member of said first named means to the clamp bracket, the pivotal axes of said connecting means being generally parallel to said horizontal transverse pivot and a plane containing said axes also containing the axis of said pivot in at least one position of said motor unit whereby said motor unit is substantially free to tilt in a portion of its range of pivotal movement.

6. In combination, an outboard propulsion unit for boats and having a propeller operable under water, means pivotally mounting said unit on a horizontal transverse axis for tilt movement rearwardly and upwardly from the operative position of the propeller to a position where the propeller is out of water, and kinetic energy absorbing means to control the pivotal movement of said unit on said axis and having substantially little resistance during rearward movement through a predetermined angular portion of the movement and progressively greater resistance upon further rearward and upward movement.

7. In an outboard motor, the combination of a clamp bracket adapted to overlie and be clamped to the transom of a boat with a part of the bracket extending downwardly behind the transom, a swivel bracket pivotally carried by said clamp bracket to tilt on a horizontal transverse axis over the transom, a motor unit dirigibly carried by said swivel bracket, and a hydraulic shock absorber interconnecting said clamp bracket and said swivel bracket to control the tilting of the latter and comprising substantially vertically disposed cooperative cylinder and piston members having the lower end of one member pivotally connected to said downwardly extending part of said clamp bracket and the upper end of the other member pivotally connected to said swivel bracket to the rear and below said transverse tilt axis whereby said members are extended by tilting of the motor rearwardly and upwardly from operative position, said shock absorber having substantially little resistance during rearward movement through a predetermined angular portion of the movement and progressively greater resistance upon further rearward and upward movement.

8. In an outboard motor, the combination of: a clamp bracket adapted to be secured to the transom of a boat, a motor unit, a swivel bracket carrying said motor unit and pivotally connected to said clamp bracket on a horizontal transverse axis to provide for tilt of the motor unit from operative upright position, abutment means between said brackets and determining said operative upright position of the motor unit and preventing pivotal movement of the motor unit forwardly beyond said position under forward thrust conditions, means limiting the rearward and upward tilting movement of the motor unit, and hydraulic damping means interposed between and connecting said clamp bracket and said swivel bracket to dissipate a substantial portion of the energy due to sudden pivotal movement of the motor unit upon said axis, said damping means having substantially little resistance to the initial rearward pivotal movement of the motor unit and thereafter applying progressively greater resistance to the pivotal movement of said unit.

9. In an outboard motor, the combination of: a clamp bracket adapted to be secured to the transom of a boat, a motor unit, a swivel bracket carrying said motor unit and pivotally connected to said clamp bracket on a horizontal transverse axis to provide for tilt of the motor unit from operative upright position, abutment means between said brackets and determining said operative upright position of the motor unit and preventing pivotal movement of the motor unit forwardly beyond said position under forward thrust conditions, and hydraulic damping means interposed between said brackets and limiting the rearward and upward tilting movement of the motor unit and serving to dissipate a substantial portion of the energy due to sudden pivotal movement of the motor unit upon said axis, said damping means having substantially little resistance to the initial rearward pivotal movement of the motor unit and thereafter applying substantially greater resistance to the pivotal movement of said unit.

10. In combination, an outboard propulsion unit for boats and having a propeller operable under water, means pivotally mounting said unit to a boat transom on a horizontal transverse axis for tilt movement rearwardly and upwardly from the operative underwater position of the propeller to a position where the propeller is out of water, said mounting means including abutment means limiting the forward pivotal movement of the unit and thereby determining the operative position for the propeller under water, and hydraulic damping means carried by said mounting means and limiting the tilt movement of said unit and serving to dissipate a substantial portion of the energy due to sudden tilting of said unit, said damping means having substantially little resistance to the initial rearward pivotal movement of the propulsion unit and thereafter applying substantially greater resistance to the pivotal movement of said unit.

11. In an outboard motor, the combination of: a clamp bracket adapted to be secured to the transom of a boat, a motor unit, a swivel bracket carrying said motor unit and pivotally connected to said clamp bracket on a horizontal transverse axis to provide for tilt of the motor unit from operative upright position, abutment means between said brackets and determining said operative upright position of the motor unit and preventing pivotal movement of the motor unit forwardly beyond said position under forward thrust conditions, and hydraulic damping means interposed between said brackets and limiting the rearward and upward tilting movement of the motor unit and serving to dissipate a substantial portion of the energy due to sudden pivotal movement of the motor unit upon said axis, said damping means having substantially little resistance to the initial return movement of the motor unit and thereafter applying substantially greater resistance to the return movement of said unit as it approaches said upright position.

12. In combination, an outboard propulsion unit for boats and having a propeller operable under water, means pivotally mounting said unit to a boat transom on a horizontal transverse axis for tilt movement rearwardly and upwardly from the operative underwater position of the propeller to a position where the propeller is out of water, said mounting means including abutment means limiting the forward pivotal movement of the unit and thereby determining the operative position for the propeller under water, and hydraulic damping means carried by said mounting means and limiting the tilt movement of said unit and serving to dissipate a substantial portion of the energy due to sudden tilting of said unit, said damping means having substantially little resistance to the initial return movement of the propulsion unit and thereafter applying substantially greater resistance to the movement of said unit as it approaches said upright position.

13. In combination, an outboard propulsion unit for boats and having a propeller operable under water, means pivotally mounting said unit to a boat transom on a horizontal transverse axis for tilt movement rearwardly and upwardly from the operative underwater position of the propeller to a position where the propeller is out of water, said mounting means including abutment means limiting the forward pivotal movement of the unit and thereby determining the operative position for the propeller under water, and hydraulic damping means carried by said mounting means and limiting the tilt movement of said unit and serving to dissipate a substantial portion of the energy due to sudden tilting of said unit, said damping means having substantially little resistance to the initial rearward movement of the propulsion unit and thereafter applying progressively greater resistance to the movement of said unit and having substantially little resistance to the initial return movement of the propeller unit and thereafter applying progressively greater resistance to the movement of said unit as it approaches said upright position.

References Cited in the file of this patent

UNITED STATES PATENTS

| | | |
|---|---|---|
| 1,574,977 | Johnson | Mar. 2, 1926 |
| 1,725,824 | Parke | Aug. 27, 1929 |
| 1,958,119 | Tarr | May 8, 1934 |
| 2,198,842 | Renaux | Apr. 30, 1940 |